United States Patent
De Paulis et al.

(10) Patent No.: US 8,760,969 B2
(45) Date of Patent: Jun. 24, 2014

(54) SYSTEM AND METHOD FOR DETECTING AND MEASURING PHENOMENA RELATING TO ALTIMETRIC VARIATIONS IN THE SEAFLOOR

(75) Inventors: Riccardo De Paulis, Parma (IT); Claudio Maria Prati, Milan (IT); Fabio Rocca, Milan (IT); Stefano Biagini, La Spezia (IT); Cosmo Carmisciano, La Spezia (IT); Francesco Gasparoni, Venice (IT); Marc Pinto, Ameglia (IT); Alessandra Tesei, Le Grazie (IT)

(73) Assignee: ENI S.p.A., Rome (IT)

( * ) Notice: Subject to any disclaimer, the term of this patent is extended or adjusted under 35 U.S.C. 154(b) by 307 days.

(21) Appl. No.: 13/264,581

(22) PCT Filed: Apr. 14, 2010

(86) PCT No.: PCT/IB2010/000903
§ 371 (c)(1),
(2), (4) Date: Jan. 19, 2012

(87) PCT Pub. No.: WO2010/119338
PCT Pub. Date: Oct. 21, 2010

(65) Prior Publication Data
US 2012/0113752 A1     May 10, 2012

(30) Foreign Application Priority Data

Apr. 16, 2009 (IT) .............................. MI2009A0626

(51) Int. Cl.
*G01S 15/89*     (2006.01)
*G01K 11/20*     (2006.01)

(52) U.S. Cl.
USPC .......................................................... 367/88

(58) Field of Classification Search
USPC .......................................................... 367/88
See application file for complete search history.

(56) References Cited

U.S. PATENT DOCUMENTS

| | | |
|---|---|---|
| 4,126,847 A | 11/1978 | Etkins |
| 6,583,751 B1 | 6/2003 | Ferretti et al. |
| 2005/0052951 A1 | 3/2005 | Ray et al. |
| 2006/0120216 A1 | 6/2006 | Ray et al. |

(Continued)

FOREIGN PATENT DOCUMENTS

| | | | |
|---|---|---|---|
| JP | 2011196803 A | * | 10/2011 |
| WO | 00 72045 | | 11/2000 |
| WO | WO 2010119338 A1 | * | 10/2010 |

OTHER PUBLICATIONS

Barclay, P., et al., "Bathymetric results from a multi-frequency InSAS sea-trial," IEEE, pp. 1-6, (May 1, 2006) XP031168013.
Pilbrow, E. N., et al., "Active Sonar Beacons to aid Synthetic Aperture Sonar Autofocussing: Beacon-Controller Design and Performance," Proceedings of Electronics New Zealand Conference, pp. 1-6, (Sep. 1, 2003) XP007910612.

(Continued)

*Primary Examiner* — Daniel Pihulic
(74) *Attorney, Agent, or Firm* — Oblon, Spivak, McClelland, Maier & Neustadt, L.L.P.

(57) ABSTRACT

A system and method for detecting and measuring phenomena relating to altimetric variations in the seafloor. The system including an autonomous submarine vehicle equipped with at least one interferometric sonar sensor configured to send an acoustic signal towards the seafloor and acquire the image of the seafloor generated by the reflection of said acoustic signal sent. The system also including a plurality of elements reflecting sound waves firmly fixed to the seafloor so as to outline a reference path for the passage of the autonomous submarine vehicle.

15 Claims, 4 Drawing Sheets

(56) References Cited

U.S. PATENT DOCUMENTS

| | | |
|---|---|---|
| 2007/0070808 A1 | 3/2007 | Ray et al. |
| 2008/0106977 A1 | 5/2008 | Ray et al. |
| 2008/0137485 A1 | 6/2008 | Ray et al. |
| 2008/0181055 A1 | 7/2008 | Ray et al. |
| 2008/0192569 A1 | 8/2008 | Ray et al. |
| 2008/0279636 A1 | 11/2008 | Ray et al. |
| 2009/0016157 A1 | 1/2009 | Ray et al. |
| 2012/0113752 A1* | 5/2012 | De Paulis et al. ............... 367/88 |
| 2013/0039150 A1* | 2/2013 | Goto et al. .................... 367/88 |

OTHER PUBLICATIONS

Silva, S. R., et al., "Synthetic Aperture Techniques for Sonar Systems," Advances in Sonar Technology, pp. 15-42, (Feb. 1, 2009) XP007910613.

Eisler, T. J., "Backscattering cross section of a rigid biconic reflector," Journal of the Acoustical Society of America, vol. 108, No. 4, pp. 1474-1479, (Oct. 1, 2000) XP012001922.

International Search Report Issued Jul. 19, 2010 in PCT/IB10/000903 Filed Apr. 14, 2010.

* cited by examiner

Fig.4
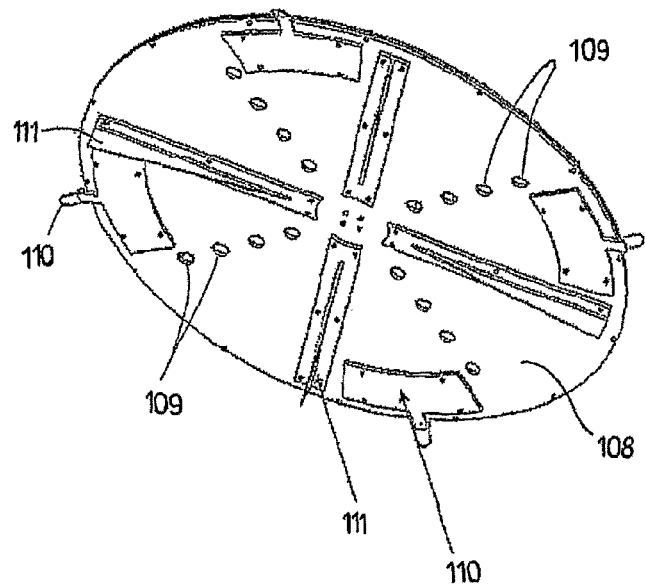
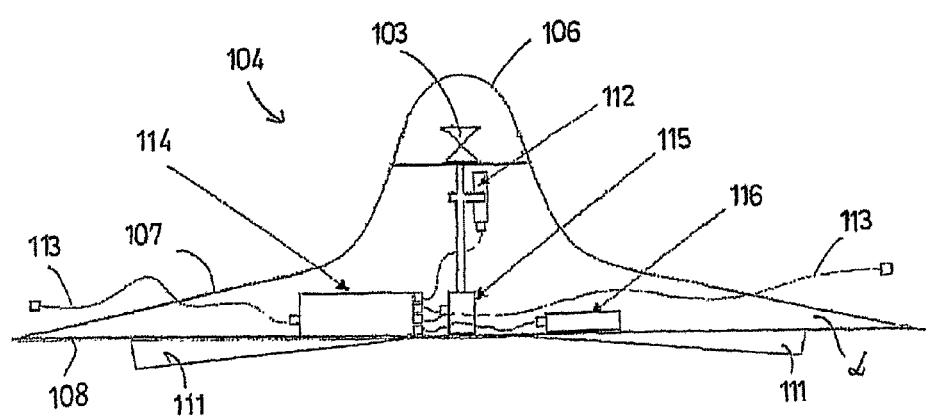
Fig.5

SYSTEM AND METHOD FOR DETECTING AND MEASURING PHENOMENA RELATING TO ALTIMETRIC VARIATIONS IN THE SEAFLOOR

The present invention relates to a system and method for detecting and measuring phenomena relating to altimetric variations in the seafloor.

Altimetric variations are slow progressive phenomena of the negative lowering (subsidence) or positive raising (uplift) of the ground not linked to sedimentation or erosion.

Uplift phenomena are mainly generated by tectonic phenomena, but can also be connected to instability or gravitational phenomena.

The lowering of the ground can also be linked to natural causes, such as tectonic processes, isotactic movements and physico-chemical transformations (diagenesis) of sediments due to lithostatic pressure or oscillation of the stratum level.

Some aspects of the anthropic activity can significantly influence the phenomenon or even trigger it.

The lowering of the ground induced by human beings is generally exerted in relatively short times (at the most tens of years), with effects which can greatly jeopardize human works and activities, if control and management interventions are not effected beforehand. The most common causes are essentially excessive exploitation of aquifers, the extraction of hydrocarbons, hydraulic reclamations.

The importance of being able to constantly detect and monitor this phenomenon in both mainland areas and sea basins, is consequently evident.

For the detection and measuring of phenomena relating to altimetric variations in the ground of mainland areas, the differential interferometry technique based on measuring the phase difference of two radar signals backscattered from the land relating to a same point, is currently known.

These techniques process the radar data revealed through SAR (Synthetic Aperture Radar) systems which comprise sensors and an antenna assembled on an orbiting satellite at a height of between 250 km and 800 km.

The sensors used in SAR systems emit signals to the Earth, having a frequency within the range of microwaves, whereas the antenna is used for collecting the complex backscattering of the signals emitted, generated from the ground.

The radar signal phase emitted by the SAR system and backscattered from the ground, is proportional to the distance between the satellite and the point of the ground in which the backscattering occurs. A phase difference between two SAR images of the same area, acquired at different moments, is therefore directly connected to a movement of the object of the image which has taken place in the time interval between the first and second acquisition instant.

An evolution in differential interferometry envisages the preventive identification through statistical analysis of a plurality of optimized backscattering points, capable of maintaining their reflection characteristics with time, on the basis of which the measurements in altimetric variations can be conducted.

The measurements effected on the single points thus identified, so-called permanent scatterers, allow altimetric variations in the order of a millimetre, to be detected, thus obtaining more accurate results.

In the case of the scarcity of natural permanent scatterers, specific artificial permanent scatterers distributed in the area of interest can be used.

Even if the interferometry techniques discussed have proved to be capable of providing indications with a millimetric precision relating to altimetric variations of the ground in mainland areas, they are not suitable for detections relating to seafloors, as radar interferometry cannot be used in an underwater environment.

In the light of this technology, however, an attempt has been made to use interferometric sonars for monitoring surface deformations of the seafloor.

The results so far obtained have mainly been disastrous due to the difficulty in having a high degree of precision in the focalization phase of the different images of the seafloor in particular due to the considerable variability in the characteristics of the seafloor itself as a result of the action of the water movement.

Other techniques currently used in detecting and measuring altimetric variations of seafloors envisage the use of high resolution multitemporal acquisitions of the bathymetry of the seafloor.

By analyzing and interpreting the differences of various acquisitions, it is possible to establish possible surface deformations. The variations which can be measured, however, are inherent to the resolution of the measurement system which is normally in the order of tens of centimetres.

An objective of the present invention is to overcome the drawbacks mentioned above and in particular to provide a system and method for detecting and measuring phenomena relating to altimetric variations of seafloors which allows measurements with a subcentrimetric or millimetric precision of said phenomenon, to be obtained.

A further objective of the present invention is to conceive a system and method for detecting and measuring phenomena relating to altimetric variations of seafloors which provides results not influenced by the characteristics of the seafloor.

These and other objectives according to the present invention are achieved by providing a system and method for detecting and measuring phenomena relating to altimetric variations of seafloors as specified in the independent claims.

Further characteristics of the system and method are object of the dependent claims.

The characteristics and advantages of a system and method for detecting and measuring phenomena relating to altimetric variations of seafloors according to the present invention will appear more evident from the following illustrative and non-limiting description, referring to the enclosed schematic drawings in which:

FIG. 4 is a perspective view from below of the submarine station of FIG. 2;

FIG. 5 is a sectional schematic view of a further embodiment of a submarine station used in the system for detecting and measuring phenomena relating to altimetric variations of seafloors according to the present invention;

Figure 1:
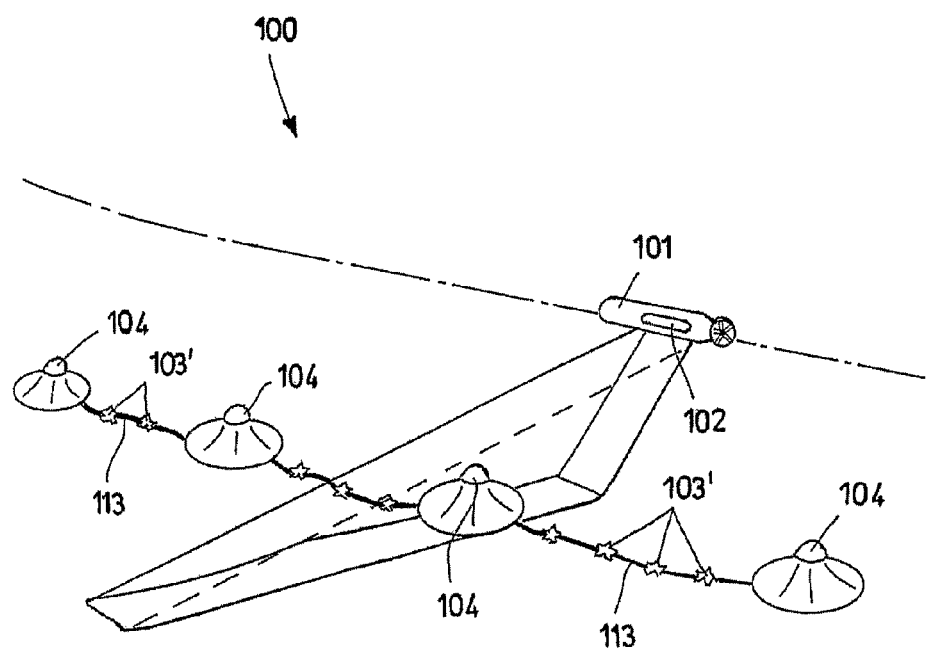
FIG. 1 is a schematic view of an embodiment of a system for detecting and measuring phenomena relating to altimetric variations of seafloors according to the present invention.
Figure 2:
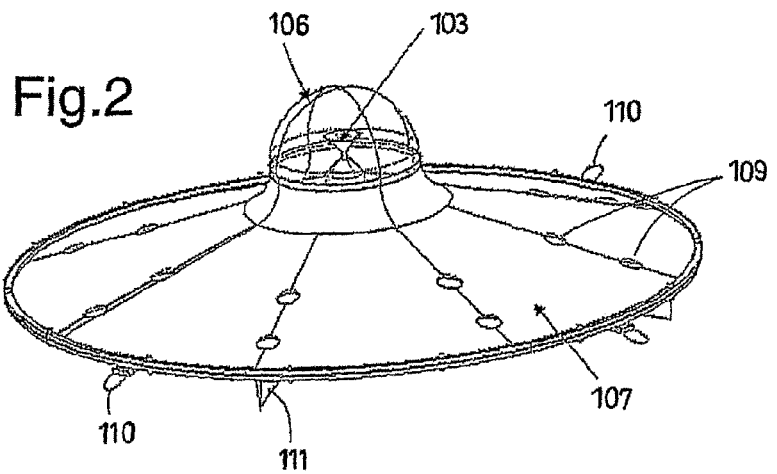
FIG. 2 is a perspective view of a preferred embodiment of a submarine station used in the system for detecting and measuring phenomena relating to altimetric variations of seafloors according to the present invention.
Figure 3:
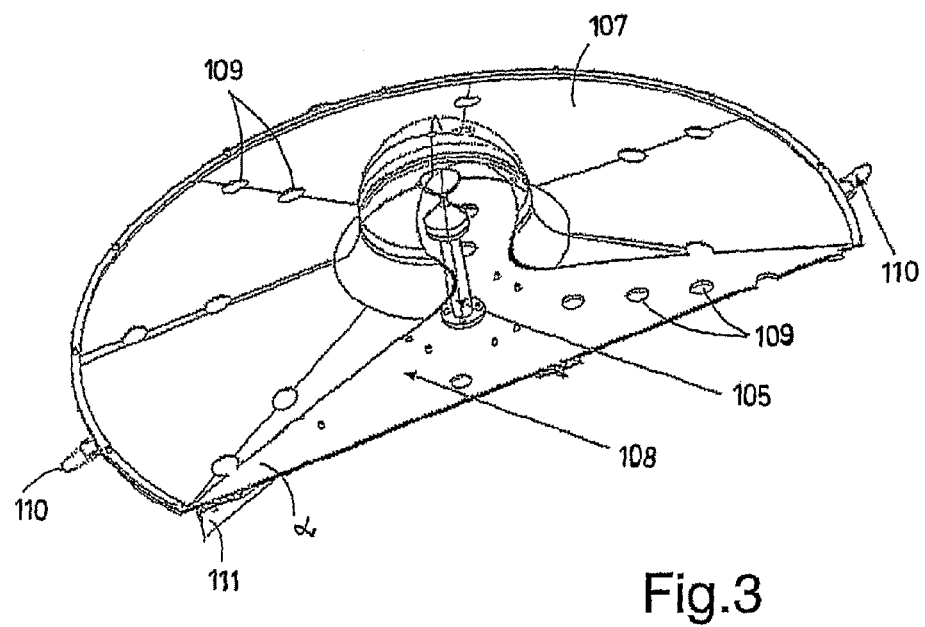
FIG. 3 is a partial cross-sectional perspective view of the submarine station of FIG. 2.
Figure 6:
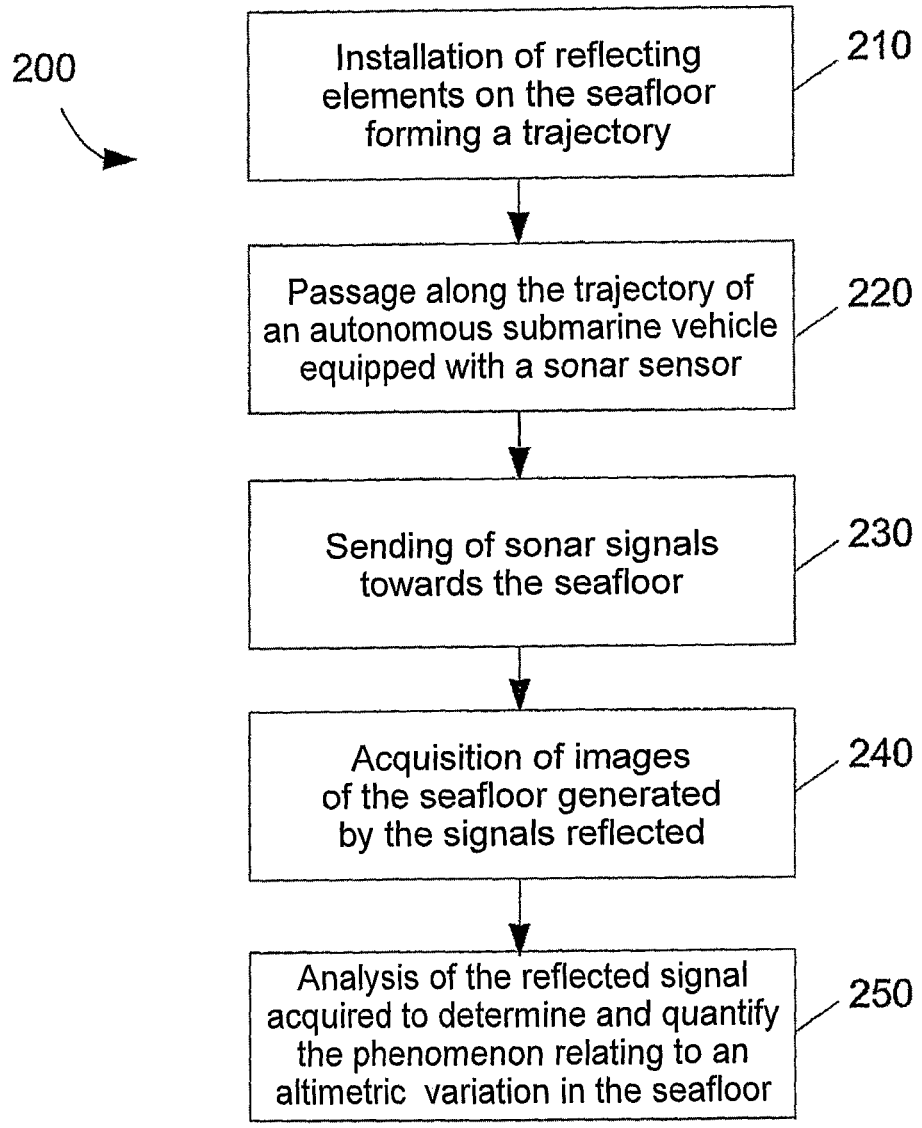
FIG. 6 is a block scheme of the steps of the method for detecting and measuring phenomena relating to altimetric variations of seafloors according to the present invention.

With reference to the figures, these show a system for detecting and measuring phenomena relating to altimetric variations of seafloors, indicated as a whole with 100.

The detection and measurement system 100 comprises an submarine vehicle 101 or AUV (Underwater Vehicle) on which an interferometric sonar sensor 102 is assembled, capable of sending an acoustic signal and receiving the signal reflected from the seafloor.

The sonar sensor 102 is assembled in the lower portion of the AUV 101 so that it is tilted towards the seafloor and thus emits sound waves with a pre-established acquisition angle and preferably equal to about 12° with respect to the seafloor.

A plurality of elements 103, 103', capable of reliably generating a reflection signal of the sound wave sent by the sonar sensor 102, is advantageously firmly fixed on the seafloor in known positions.

The elements 103, 103' reflecting the sound wave are preferably positioned so as to outline a substantially linear reference path or create a track.

Thanks to the reflection of the sound waves ensured by the reflecting elements 103, 103', the interferometric sonar sensors 102 detect, with each passage, sonar images relating to the same identical portions of seafloor. As a result of this, the phase difference data obtained from a comparison of the images of the same portions revealed in different passages are capable of providing consistent and precise results.

This differential analysis therefore provides accurate information with respect to a possible difference measured in the depth of the seafloor of a same portion, i.e. in relation to a possible phenomenon of an underwater altimetric variation.

First reflecting elements 103 are preferably situated at the seafloor on a vertical support 105 and with a biconical configuration, a geometry which, following studies on the part of the Applicant, has proved to be optimum for the reflection of sound waves in an underwater environment.

Bicone in fact has a practically punctiform sonar image and therefore a high spatial resolution, and are characterized by an omnidirectional acoustic response on the horizontal plane and are relatively independent of the incidence angle on the vertical plane.

The bicone preferably has a angle at the vertex ranging from 85° to 95° and preferably equal to 90°, and a base diameter ranging from 5 cm to 10 cm.

The first reflecting elements 103 are preferably made of brass with a polished finishing in order to optimize the reflection.

In a preferred embodiment, each of the first reflecting elements 103 and the relative vertical support 105 are situated inside a submarine station 104 in order to guarantee their protection against the action of drag nets used for fishing, which scrape the floor collecting everything they encounter.

Each submarine station 104 consists of a frusto-conical base 107, 108, equipped with a protection casing 106 for the reflecting element 103, situated in correspondence with the upper surface of the frusto-conical base and connected to the same through an intermediate portion.

In order to preserve the reflection characteristics of the reflecting elements 103, the protection casing 106 has a dome-shaped conformation, preferably hemispherical, and is made of a material permeable to sound waves.

In particular, the casing 106 is made of a material having a fine thickness in order not to interfere with the passage of the sound waves.

The particular geometry and material selected for the production of the protection casing 106, in addition to the fact that the submarine station 104 is completely inundated once it has been installed, allow the reflecting properties of the first reflecting elements 103 to be kept essentially unaltered.

The base 107, 108 of the submarine station 104 has a frusto-conical conformation to minimize the reflection of the sound waves in the direction of the interferometric sonar 102.

In particular, for an optimum reduction of the refection, the joining angle α between the shell 107 and bottom 108 of the frusto-conical base 107, 108 is less than or equal to 30° and preferably equal to 20°.

This conformation of the base 107, 108 of the submarine station 104 limits the interference between the signal reflected by the reflecting element 103 and that due to the shell 107 of the base 107, 108 and the further measuring instrumentation possibly housed inside the submarine station 104.

In embodiments where additional measuring instrumentation is not used, the casing 107 of the frusto-conical base can be made of a material permeable to sound waves and in particular of the same material as the protection casing 106.

It is otherwise more appropriate for the shell 107 of the base to be made of a material impermeable to sound waves in order to protect the instrumentation from the acoustic signal sent from the sonar 102.

To ensure that the reflecting element 103 inside the submarine station 104 is completely immersed in water, the shell 107 and the bottom 108 of the frusto-conical base 108 are equipped with a plurality of holes 109 which allow the entrance of water inside the station 104.

Furthermore, the submarine station 104 is equipped with a plurality of anchoring hooks 110 positioned along the lower perimeter of the frusto-conical base 108 which facilitate the depositing of the station 104 on the seafloor, and a plurality of blades 111 situated below the base 108 for the stabilization and fixing of the station 104 in the sediment on the seafloor.

At least one sensor 112 capable of detecting the pressure changes of the water column, attributed to variations in the seafloor, is preferably contained inside the submarine station 104 and integral with the vertical support 105 of the first reflecting element 103.

The combined use of the interferometric measurements with the pressure sensors 112 allows one measurement system to be calibrated with respect to another, thus obtaining more accurate measurements.

The submarine station 104 is also preferably equipped with an electronic control system 114 connected upstream and downstream with further stations 104 through specific cabling 113.

Said electronic control system 114 is preferably equipped with a tiltmeter and temperature measurer.

Furthermore, there is also a conductivity measurer 116 integral with the base 108 of the submarine station 104 and connected to the electronic control system 114.

These complementary measurements support the whole processing phase of the data collected by the interferometric sonar 102.

Finally, a regulation mechanism 115 is installed on some submarine stations 104, in the experimental phase, which, piloted by the electronic control system 114, creates a virtual altimetric variation in order to verify the correct functioning of the system 100.

In a preferred embodiment, the connection cables 113 of the submarine stations 104 are provided with second reflecting elements 103' which can also be different from the first reflecting elements 103 situated inside the submarine stations 104.

The second additional reflecting elements 103' connected to the connection cables 113 allow a further improvement in the focalization of the images taken at different times.

The method 200 for detecting and measuring phenomena relating to altimetric variations of seafloors comprises the following steps:

A plurality of reflecting elements 103, 103' of sound waves is installed at the seafloor so as to outline a reference path or trajectory for an autonomous submarine vehicle 101 equipped with at least one interferometric sonar sensor 102. (phase 210)

The first reflecting elements 103 are preferably of the type described above having a biconical conformation and are contained in a protection submarine station 104 as previously indicated.

Even more preferably, second reflecting elements 103' are positioned in correspondence with the connection cables 113 between two submarine stations 104.

The autonomous submarine vehicle 101 is subsequently passed at a pre-established depth substantially along the trajectory outlined by the plurality of reflecting elements 103, 103' (phase 220).

The autonomous submarine vehicle 101 is equipped with an interferometric sonar sensor 102 which sends (phase 230) a signal towards the seafloor and acquires (phase 240) the images generated by the reflection on the seafloor of the signal sent. These images of the seafloor also comprise the signal reflected by the reflecting elements 103, 103'.

After at least two passages of the autonomous submarine vehicle 101, and therefore two acquisitions of images of the seafloor, an analysis of the reflected signal acquired is effected in order to determine and quantify a possible variation in the phase of the same and consequently the relative altimetric variations (phase 250).

The number of passages is preferably more than two and equal to a number sufficient for obtaining consistent data through suitable statistical analyses.

In the test phase of the system, the submarine stations 104 equipped with the regulation mechanism 115 create virtual altimetric variations in order to verify the correct functioning of the system 100.

The characteristics of the system and method object of the present invention, are clear from the above description, as are also the relative advantages.

Finally, the system and method thus conceived can evidently undergo numerous modifications and variants, all included in the invention; furthermore, all the details can be substituted by technically equivalent elements. In practice, the materials used, as also the dimensions, can vary according to technical requirements.

The invention claimed is:

1. A system for detecting and measuring phenomena of altimetric variation of the seafloor, the system comprising:
   an autonomous submarine vehicle equipped with at least one interferometric sonar sensor configured to send an acoustic signal towards the seafloor and acquire an image of the seafloor generated by the reflection of said acoustic signal sent; and
   a plurality of elements reflecting sound waves firmly fixed to the seafloor so as to outline a reference path for the passage of said autonomous submarine vehicle.

2. The system according to claim 1, wherein at least one of said plurality of elements has a biconical configuration.

3. The system according to claim 1, wherein at least one of said plurality of elements is arranged on a vertical support.

4. The system according to claim 1, wherein at least one of said plurality of elements is installed inside a submarine station fixed to the seafloor.

5. The system according to claim 4, wherein said submarine station has a frusto-conical base plate and is provided with a protective casing for at least one of said plurality of said elements arranged inside said submarine station, said protective casing being placed at an upper plane of said frusto-conical base plate and joined to it, said protective casing being made from a material permeable to sound waves.

6. The system according to claim 5, wherein said protective casing is dome-shaped.

7. The system according to claim 5, wherein said frusto-conical base plate comprises a shell portion and a base portion, the joining angle ($\alpha$) between said shell and said base being less than or equal to 30°, preferably equal to 20°.

8. A system according to claim 5, wherein said frusto-conical base plate is provided with a plurality of holes.

9. The system according to claim 5, wherein said submarine station is equipped with a plurality of anchoring hooks arranged along the lower perimeter of said frusto-conical base plate and with a plurality of blades arranged below said frusto-conical base plate.

10. The system according to claim 4, wherein at least one of said plurality of elements is arranged on a vertical support inside said submarine station and fixedly connected to said vertical support, and at least one sensor is foreseen that is capable of detecting pressure changes of the water column.

11. The system according to claim 4, wherein said submarine station is equipped with an electronic control system connected upstream and downstream with further submarine stations.

12. The system according to claim 11, wherein said electronic control system is preferably provided with a tiltmeter and a temperature measurer.

13. The system according to claim 11, wherein said electronic control system has a conductivity measurer connected to it, which is fixedly connected to said base of said submarine station.

14. The system according to claim 4, wherein said submarine station is connected to an adjacent submarine station through at least one cable, said cable being provided with a plurality of second reflecting elements.

15. A method for detecting and measuring phenomena of altimetric variation of the seafloor, the method comprising:
   installing a plurality of elements reflecting sound waves at the seafloor so as to form a reference path for an autonomous submarine vehicle equipped with at least one interferometric sonar sensor;
   making said autonomous submarine vehicle pass at a predetermined depth along the reference path formed from said plurality of elements reflecting the sound waves;
   sending at least one acoustic signal towards the seafloor;
   acquiring a plurality of images of the seafloor generated by the reflection of said acoustic signals sent, said images of the seafloor comprising at least one signal reflected by said reflecting elements;
   analyzing said images acquired to determine and quantify altimetric variations.

* * * * *